April 3, 1928.
W. F. GROENE
1,664,622
CRANK SHAFT LATHE CHUCK
Filed June 20, 1925
2 Sheets-Sheet 1
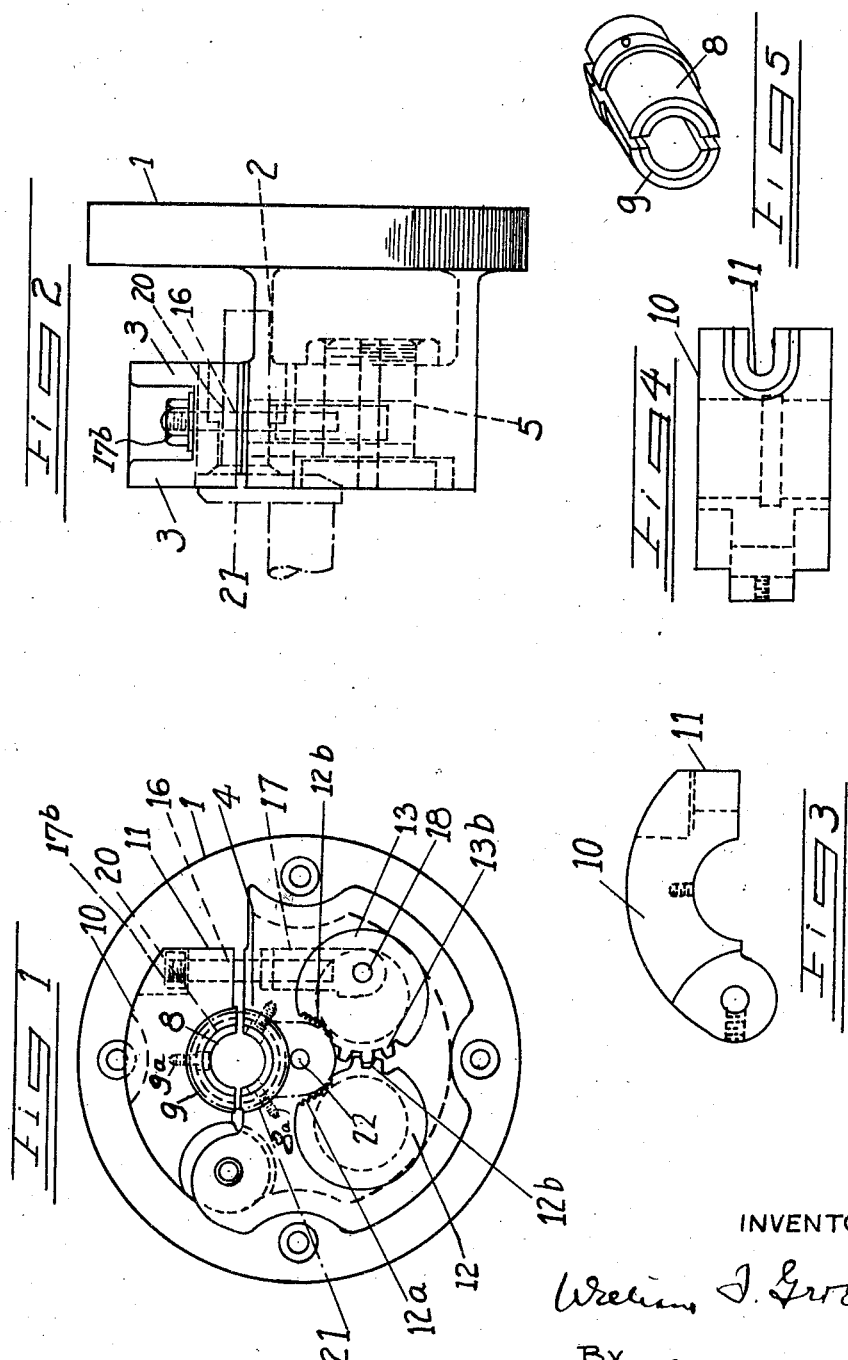
INVENTOR
William F. Groene
BY
ATTORNEYS April 3, 1928.
W. F. GROENE
1,664,622
CRANK SHAFT LATHE CHUCK
Filed June 20, 1925
2 Sheets-Sheet 2
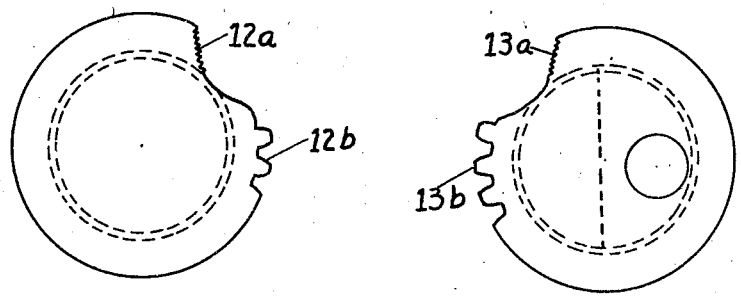
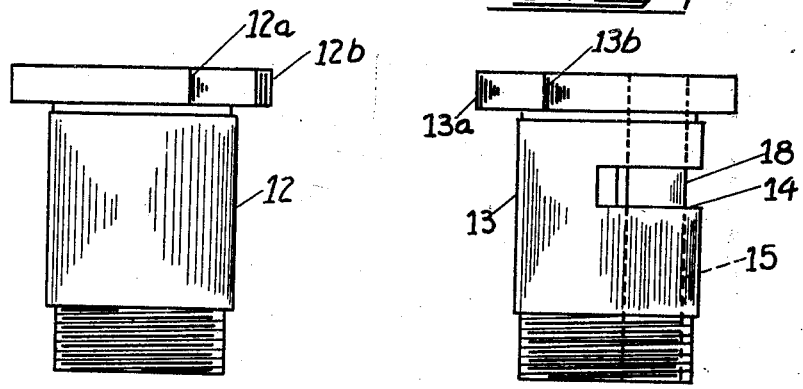
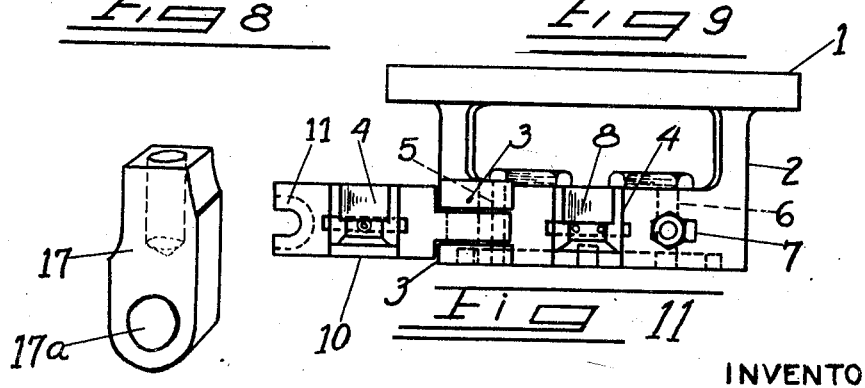
INVENTOR
William F. Groene
BY
ATTORNEYS Patented Apr. 3, 1928.

1,664,622

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

CRANK-SHAFT LATHE CHUCK.

Application filed June 20, 1925. Serial No. 38,459.

My invention relates to devices for chucking the ends of crank shafts in the operation of turning the crank pins.

The problem of chucking crank shafts lies in the fact that with a frictional grip in the chuck it is required to apply a centering and locating device to the cheek of the shaft to prevent the shaft from revolving in the frictional grip. This centering has in the past required the use of a plurality of screws or screw controlled devices which were independently operated, and called for the exercise of skill and patience in order to bring the parts into the position of exactly aligning the pins to be turned with the axis of revolution of the chuck.

It is the object of my invention to provide a device in which a predetermined shaft can be inserted and by the manipulation of a single element brought to position of clamping the end of the shaft in a position off center of the chuck, while engaging the adjacent cheek of the shaft to bring the axis of the crank pin to be turned exactly in alignment with the center or axis of the chuck.

It is further my object to provide for an equalizing action in the check gripping and centering devices whereby the locating feature thereof becomes accurate automatically.

I accomplish my objects by that certain construction and arrangement of parts to be hereinafter more specifically pointed out and claimed.

In the drawings:

Figure 1 is a front elevation of portions of the chuck.

Figure 2 is a side elevation of the chuck.

Figure 3 is a side elevation of the clamping lever.

Figure 4 is a plan view of the part shown in Figure 3.

Figure 5 is a perspective view of the bushing pieces.

Figure 6 is a front elevation of one of the cheek gripping elements.

Figure 7 is a like view of the other of said elements.

Figure 8 is a plan view of the device shown in Figure 6.

Figure 9 is a plan view of the device shown in Figure 7.

Figure 10 is a perspective view of the pivot bolt mounting element.

Figure 11 is a plan view of the chuck body.

The chuck in its mounting in the lathe and general structure may be of desired type, and is shown as having a mounting plate 1 and a body 2. The body has at its forward end interspaced bosses 3 in which is mounted the pivot pin for the hinged clamp. It is also formed with a semi-circular cavity 4 along the central vertical plane thereof, in which is seated the bushing to be clamped in place about the shaft end, that is to be held in the chuck. It is also provided with cavities 5 and 6 in which are journaled the two cheek gripping elements, and from the cavity 6, an opening 7 extends upwardly for the passage and manipulation of the pivot bolt.

As shown in Figure 5 the bushing which engages directly about the end of a shaft to be chucked, is formed of halves 8 and 9, of which the half 8 is secured in the central cavity 4, by means of screws or the like, and the half 9 is held in the clamping lever, also by a suitable screw. The screw holes are shown at $8^a$ for the part 8 and at $9^a$ for the part 9.

The hinged clamp 10 (Figures 3 and 4) is pivoted on a pin between the two bosses 3, and has a curved body in which the bushing part 9 is mounted, and terminates in a bifurcated portion at 11, which portion is engaged by the nut on the pivot bolt.

The cheek gripping elements are formed with bodies 12 and 13 the former of which is a smooth round pin with a threaded end for a nut, and the other of which is similar except that it has a slot 14 therein for the pivot bolt mounting piece, and a hole 15 formed through it, so as to mount the stud on which the mounting piece is pivoted. It will be noted that this stud is off the axial center of the piece 13.

The outer ends of the two bodies are formed as disks, having roughened cam portions $12^a$ and $13^a$, and a few teeth as at $12^b$ and $13^b$, which teeth mesh with each other.

The pivot bolt, shown at 16, is mounted in a piece 17 (Figure 10) which lies in the slot 14 in the gripping element body 13. The piece has a hole 17a therein through which passes the mounting stud 18, as shown in Figure 1. The nut for the bolt is shown at 17.

With the parts properly proportioned for a crank shaft having given shape, the operation of the parts requires merely swinging over the hinged clamp, swinging the pivot bolt so that its nut lies in the fork of the hinged clamp, and tightening up on this nut.

Describing the operation in detail, the shaft with its end shown in dotted lines at 20, laid in the bushing section that is clamped to the chuck, has its cheek 21, shown in a similar way, depending to a point between the two gripping devices, and in a plane to be engaged by the roughened cam faces on the ends of said gripping devices. The pivot bolt extending up through the clearance hole in the chuck body, is moved to permit the hinged clamp, retaining the other bushing half, to be swung down, and the pivot bolt then tilted into the bifurcated end of the lever.

As the operator turns down the nut on the bolt, it first tightens down on the hinged clamp, and then begins to rock the gripping element 13, to bring its cam face up against the cheek. Due to the intermeshing relation of the two gripping devices, the gripping device 12 will be rocked also, to bring its cam face up against the shaft cheek.

Due to the nature of the teeth, the pressures which the two cam faces exercise against the cheek will be equalized, since the shaft cheek will swing, and the two grippers are geared together. As a result the clamp screw operation will bring the cheek to position, in a properly designed chuck, so that the crank pin to be turned will lie exactly in the axis of the chuck. This axis is illustrated at the point 22.

Having thus described my invention, what I claim as new and desire to secure by Letters Patent, is:—

1. In a crank shaft lathe, the combination with a chuck body having shaft clamping means thereon arranged to surround a pin of the crank shaft, cheek grippers on the body for engaging the cheek of a crank shaft to center the shaft, said grippers comprising rotary bodies having intermeshing teeth, and cheek gripping jaws opposed to each other, and means for rocking one of the grippers.

2. In a crank shaft lathe, the combination with a chuck body of a shaft clamping device having a movable element, cheek grippers having operative connection whereby movement of one will move the other conjointly to cheek gripping and shaft centering position, and a pivot bolt connected to one of the grippers, said bolt being movable to a position of engagement with the movable element of the clamping device, and the connection of the bolt with the gripper being such that turning down the bolt nut, will exert a gripping motion on the gripper.

3. In a crank shaft lathe the combination with a chuck body having journals lengthwise thereof, a pair of rotary pins in said journals, said pins having exposed ends formed with opposed cam faces to act as gripping jaws, said cams having teeth intermeshing directly with each other whereby operation of one will operate the other, and said pins so mounted that the said jaws will engage the two sides of the cheek of a shaft to be turned and mounted in the chuck, and center and grip the cheek.

4. In a crank shaft lathe the combination with a chuck body having journals lengthwise thereof, a pair of rotary pins in said journals, said pins having exposed ends formed with opposed cam faces to act as gripping jaws, and with intermeshing teeth whereby operation of one will operate the other, and said pins so mounted that the said jaws will engage the cheek of a shaft to be turned and mounted in the chuck, and center and grip the cheek, and means for operating the grippers comprising a bolt mounted off center in one of the grippers.

5. In a crank shaft lathe the combination with a chuck body having journals lengthwise thereof, a pair of rotary pins in said journals, said pins having exposed ends formed with opposed cam faces to act as gripping jaws, and with intermeshing teeth whereby operation of one will operate the other, and said pins so mounted that the said jaws will engage the cheek of a shaft mounted in the chuck and to be turned, and center and grip the cheek, a shaft clamping means for engaging the shaft to be turned and a bolt for tightening the clamping means, said bolt being so located that it engages and operates the said clamping means.

6. In a crank shaft lathe the combination with a chuck body, a clamping device for a shaft comprising a member of the chuck body and a clamp having a shaft engaging member, and a bifurcated end, and a bolt having a nut to engage said bifurcated end, and force down the clamp, a shaft gripping element in the chuck, said bolt being connected to said shaft gripping element to operate it upon the upward pull applied to the bolt, in turning down the nut to force the clamping lever over the shaft to be turned.

WILLIAM F. GROENE.